United States Patent [19]
Evans et al.

[11] Patent Number: 5,827,790
[45] Date of Patent: Oct. 27, 1998

[54] UNLEADED TRANSPARENT VITREOUS GLASS COMPOSITION AND ARTICLES

[75] Inventors: Philip A. Evans; Paul Harrison, both of Leeds; Rolf A. Wirtz, Gerrards Cross, all of Great Britain

[73] Assignee: Proceram, Buckinghamshire, Great Britain

[21] Appl. No.: 943,196

[22] Filed: Oct. 3, 1997

Related U.S. Application Data

[63] Continuation of Ser. No. 689,345, Aug. 8, 1996, abandoned, which is a continuation of Ser. No. 495,573, Aug. 4, 1995, abandoned.

[30] Foreign Application Priority Data

Feb. 13, 1993 [GB] United Kingdom ............... 9302927

[51] Int. Cl.$^6$ ............................................. C03C 3/091
[52] U.S. Cl. .............................. 501/66; 501/64; 501/67
[58] Field of Search .................................. 501/64, 66, 67

[56] References Cited

U.S. PATENT DOCUMENTS

| 3,801,356 | 4/1974 | Mulfinger et al. | 117/93.3 |
|---|---|---|---|
| 4,361,654 | 11/1982 | Ohmura et al. | 501/21 |
| 4,565,791 | 1/1986 | Boudot et al. | 501/66 |
| 4,970,178 | 11/1990 | Klimas et al. | 501/26 |
| 5,605,869 | 2/1997 | Mangat et al. | 501/14 |
| 5,633,090 | 5/1997 | Rodek et al. | 428/428 |
| 5,691,254 | 11/1997 | Sakamoto et al. | 501/17 |

FOREIGN PATENT DOCUMENTS

| 0 444 821 A1 | 2/1991 | European Pat. Off. . |
|---|---|---|
| 0 579 406 A1 | 6/1993 | European Pat. Off. . |
| 359251 | 12/1961 | Switzerland . |
| 2 263 478 | 1/1993 | United Kingdom . |

OTHER PUBLICATIONS

Derwent Abstract; AN 91–347132 and DD,A,291 545; by Inst. Festkorp. Elekt. et al.; Jul. 4, 1991.

Derwent Abstract; AN 88–258320 and JP,A,63 270 328; by Kakashima KK; Nov. 1988.

*Primary Examiner*—Karl Group
*Attorney, Agent, or Firm*—Banner & Witcoff, Ltd.

[57] ABSTRACT

The present invention relates to an unleaded durable transparent vitreous glass composition comprising a combination of (a) up to 98 wt % of a low alumina alkali borosilicate, (b) 2–20 wt % of a major addition of one element selected from the group of zirconium, tin and titanium, and (c) less than 10 wt % of at least one element selected from bismuth, barium, strontium, zinc, lanthanum, molybdenum, cerium and/or a fluoride containing inorganic compound wherein the amounts of (a), (b) and (c) are calculated on the basis of the total amount of the oxide forms of (a), (b) and (c), a process for its production and the use of said composition.

15 Claims, No Drawings

UNLEADED TRANSPARENT VITREOUS GLASS COMPOSITION AND ARTICLES

This application is a continuation of application Ser. No. 08/689,345, filed on Aug. 8, 1996 now abandoned which is a continuation of application Ser. No. 08/495,573, filed Aug. 4, 1995 now abandoned.

This invention relates to unleaded transparent vitreous glass compositions and articles, and more particularly to unleaded single addition intermediate oxide, alkali borosilicate based vitreous glass compositions which are usable to form transparent, durable, decorative/functional glass articles and glass materials for applications including tableware, container, window, architectural, light bulb, radiation absorbing, protective, additive, release, and waste containment categories, glass crystal glass fibres, and dental porcelains.

Lead has long been recognized as a toxic substance, and adverse health effects such as damage to the liver, the kidneys, and the nervous, reproductive, cardiovascular, immune, and gastrointestinal systems may well result from exposure over months or years to lead. Infants and children are the most sensitive to lead exposure. Several recent studies have indicated that lead causes behavioural and performance related deficiencies in children exposed to the substance at levels below those which produce physical effects. Other recent studies have shown that the fetus is sensitive to low levels of lead in the mother's blood resulting in impaired fetal development and low birth weight.

The health hazard is perceived in terms of lead release levels from lead-containing glass articles and compositions, which affect the health of the general public which buys the products. Resistance to both acid and alkaline chemical attack and waste disposal aspects is of paramount importance in present day society with the use of such glass containers to store acid food and drinks, and the use of dish-washing machines with alkaline detergents/acidic descalers to clean these glass articles.

For the purposes of classification, the majority of silica based glasses can be arranged into five categories.

Soda lime glasses (Alkali-Alkaline Earth Silicate Glasses)

This represents the oldest of the glass types including the flat glasses (e.g. window glass), and container glasses having a generalized formula:

| | |
|---|---|
| $SiO_2$ | 65 to 75 |
| alkaline earth oxides (CaO, MgO) | 13 to 16 |
| alkali oxide ($Na_2O$, $K_2O$). | 12 to 17 |

The combination of raw materials, i.e. silica sand, soda ash, and limestone, produce a glass that is easily melted and shaped and that has good chemical durability. This group is particularly suited to automatic forming methods. Very small amounts, often less than 1 wt % of the total batch, of alumina and boric oxide and other chemicals are added to act as stabilizers and to increase durability in certain instances. Variants of the basic composition can also contain significant amounts of baria (Alkaline Earth Oxide). On a broader plane, certain crystal glasses (drinking glasses) can also be included in this category.

Lead Glasses (Alkali Lead Silicate Glasses)

Lead based glasses were developed and introduced in the United Kingdom in 1674 by George Ravenscroft. Lead oxide was substituted for limestone, and potash for soda ash. Such glasses have found application in crystal glass (decorative, container, and tableware areas) due to high refractive index and slow rate of increase in viscosity with decrease in temperature, making lead crystal particularly suitable for hand-made production. High electrical resistivity (increased by the potash content) has made these glasses important in electrotechnology (lamp stems, cathode ray tube applications). Lead oxide also absorbs X-rays and thus such glasses find application in radiation shielding and cathode ray tube components. A generalized formula is:

| | |
|---|---|
| $SiO_2$ | 45 to 58 wt % |
| PbO | 10 to 65 wt % |
| alkali oxides | 12 to 18 wt %. |

Again, small amounts—often less than 1 wt %—of alumina and boric oxide are added to improve chemical durability. Nickel oxide and cobalt oxide are also added in small amounts <1 wt % to decolourise the glass.

Alkaline Earth Alumina Silicate Glasses

Characteristically, these glasses are free of alkali oxides and have a high alumina content. Typically, properties include very high transformation and softening temperatures. The main applications are for high temperature thermometers, surface layer resistors, combustion tubes and glasses for halogen lamps. A generalized formula is:

| | |
|---|---|
| $SiO_2$ | 52 to 60 wt % |
| $Al_2O_3$ | 17 to 25 wt % |
| alkaline earth oxides | 13 to 17 wt %. |

Borosilicate Glasses

These glasses were developed in the early part of the 20th century to overcome the problem of cold rain cracking hot railway signal lights. This group which basically incorporates boric oxide with silica has developed into various sub-groups dependent upon the amount of boric oxide introduced and the presence/absence of alkaline earth oxides.

(i) Non Alkaline Earth Borosilicate Glass

High chemical durability, low thermal expansion ($3.3 \times 10^{-6}$ °$C.^{-1}$)—the lowest of all commercial glasses for large scale technical applications—make this the universal glass for chemical plant, pipeline, laboratory ware, and cook/oven ware applications. A generalized formula is:

| | |
|---|---|
| $SiO_2$ | >80 wt % |
| $B_2O_3$ | 12 to 13 wt % |
| alumina | 0 to 3 wt % |
| alkali oxide | 2 to 4 wt %. |

(ii) Alkaline Earth Containing Borosilicate Glass

The presence of the alkali earth oxides increases the thermal expansion to between 4 to $5 \times 10^{-6}$ °$C.^{-1}$ and slightly softens the glass, yielding more easily formed, but highly chemically durable glass. Applications include ampoules and vials for the pharmaceutical industry. A generalized formula is:

| | |
|---|---|
| SiO$_2$ | 75 wt % |
| B$_2$O$_3$ | 8 to 12 wt % |
| alkali oxide | 0 to 4 wt % |
| alkaline earth oxides<br>alumina | <5 wt % |

(iii) High Borate Borosilicate Glass

Glasses with a boric oxide content>15 wt % have lower softening points and low thermal expansion. They can be fused to metals in the expansion range of tungsten-molybdenum acting as sealing glasses. Their high electrical insulation is of prime importance. A generalized formula is:

| | |
|---|---|
| SiO$_2$ | 65 to 70 wt % |
| B$_2$O$_3$ | 15 to 25 wt % |
| alkali oxide<br>alumina | 5 to 10 wt % |

It is commonly accepted that such glasses containing>15 wt % B$_2$O$_3$ have low chemical resistance (Ref: Schott-'Technical Glasses: Physical and Chemical Properties' 1990).

Another recently developed category of glass which exists in its own right is 'glass-ceramics'. Such materials commonly contain zirconium, titanium, and fluorine in their compositions which are known to act as nucleation sites from which the crystalline phases develop and are grown during a controlled melting, cooling and annealing thermal cycle. Such materials fall outside the scope of the present invention due to their semi-crystalline nature.

It should thus be understood that it is common knowledge that small percentages of Zr, Ti, and Sn are soluble when added as opacifiers in glass compositions. This fact is reinforced by U.S. Pat. No. 4 870 034 which states that>0.5 wt % zirconia added to a borosilicate glass composition causes crystallization and hence opacity.

Tin, zirconium, and titanium are thus perceived by those skilled in the art of glass, when added as major additions to silica based vitreous systems, as opacifying agents.

It should be noted that the present invention is not based upon and does not include in its compositional variations, deliberate major additions of elements of bismuth, barium, strontium, zinc, lanthanum, molybdenum, cerium and/or an inorganic fluoride. This does not, however, preclude that at least one element, and/or inorganic fluoride or other elements being added as minor additions (c) to the present composition, i.e. at levels<10 wt % based on the total amount of said minor addition of said at least one element, the low alumina alkali borosilicate (a) and the major addition (b), provided that transparency is retained.

It is thus apparent that there is an acute need for an unleaded vitreous glass composition which is usable to form, transparent, durable, decorative/functional glass articles and glass materials for applications including tableware, container, window, architectural, light bulb, radiation absorbant, protective, additive, release and waste containment categories, glass crystal, glass fibres and dental porcelains.

A commercially acceptable system will need to satisfy the following factors:

(i) Cost (ii) Availability (iii) Effect on processing parameters, i.e. low melting temperature, rapidity of homogenization and exploitation of kinetics, (iv) Effect on ultimate properties, i.e. transparency, high refractive index and good chemical resistance.

The present invention satisfies all these factors.

The present invention -thus relates to an unleaded durable transparent vitreous glass composition comprising a combination of (a) up to 98 wt % of a low alumina alkali borosilicate, (b) 2–20 wt % of a major addition of one element selected from the group of zirconium, tin and titanium, and (c) less than 10 wt % of at least one element selected from bismuth, barium, strontium, zinc, lanthanum, molybdenum, cerium and/or a fluoride containing inorganic compound, wherein the amounts of (a), (b) and (c) are calculated on the basis of the total amount of the oxide forms of (a), (b) and (c).

For the purposes of the present invention, the use of the word 'element' shall be taken to include the material in elemental form or in suitable compound form, the latter being an oxide forming compound, and the said word 'element' should be construed accordingly.

The present invention relates to a new category of transparent vitreous glass, i.e. an 'Advanced Intermediate Oxide Vitreous Glass'. There are several elements which may take the role of an intermediate oxide in a vitreous glass structure. However, with regard to health and safety, property optimization, availability, and cost factors, Zr, Sn and Ti represent the most desirable intermediate oxides which, when combined with a low alumina alkaline borosilicate, form the basis of the present invention.

The term 'vitreous glass' is taken to mean an inorganic material having no long range crystalline order, thus being considered to be amorphous.

The term 'transparent' is taken to mean capable of transmitting useful light without diffusion except that due to refraction. This encompasses glasses which are clear and coloured/stained.

According to the present invention there is provided an unleaded transparent vitreous glass composition, comprising in combination a low alumina alkali borosilicate and a major single addition 2 to 20 wt % (calculated on the basis of the oxide form) selected from the group consisting of zirconium, tin and titanium.

The low alumina alkali borosilicate will contain a small amount of alumina (intermediate oxide) 0.5 to 6.0 wt %, preferably 0.5 to 4 wt % and calcia (alkaline earth) 0.5 to 6.0 wt %, preferably 0.5 to 4 wt % calculated on the basis of the oxide forms. Strontia and/or baria may be partially or wholly substituted for the Calcia in the role of the minor alkaline earth addition. The amounts given are calculated on basis of the total amount of the low alumina borosilicate.

The compositions will incorporate one element from Zr, Sn or Ti and said element will be incorporated into said, composition in suitable elemental or compound form, said element preferably being incorporated into said composition by melting/fritting in order that its solution is optimized, and further, that upon cooling, subsequent processing and usage, devitrification or recrystallization does not occur.

The process for the production of the transparent vitreous glass articles or glass compositions is characterized in that it includes mixing together the oxide forming materials of the low alumina alkali borosilicate composition (a), one element (b) selected from the group consisting of zirconium, tin and titanium and optionally the at least one element (c) selected from bismuth, barium, strontium, zinc, lanthanum molybdenum, cerium and/or the fluoride containing inorganic compound and melting at a temperature between 1150°–1250° C. for 1 to 4 hours, subsequently fritting and optionally grinding the resulting fragments.

This distinguishes the present invention from processes which simply involve forming articles directly from a glass melt. Such a process necessarily involves a lengthy time period (typically 10 to 24 hours) at an elevated melt temperature and the use of a refining agent (eg. $Sb_2O_5$ or $As_2O_5$) to remove entrapped gasses for the glass melt. The fritting process utilized in the present invention however, allows lower melt temperatures to be used (eg., 1150°–1250° C.), rapid homogenization of raw materials via short melt times (typically 1 to 4 hours), followed by fritting and optionally subsequent grinding. The grinding action following fritting acts to remove entrapped gases without the need for extended melting times or the use of refining agents.

The term fritting as used in the present invention is taken to mean the quenching (rapid cooling) of the glass melt such that a frit (glass splinters or fragments) is produced.

The term grinding as used in the present invention is taken to incorporate processes which comminute the glass fragments into a powder, eg. ball milling. This is, however, not taken to limit the invention.

This action results in the beneficial properties conferred by the chosen element—zirconium, tin or titanium—on the ultimate processed transparent vitreous glass article or glass composition being optimized.

The low alumina alkali borosilicate will preferably be composed of silica, boric oxide, aluminium oxide, calcium oxide, sodium oxide and/or potassium oxide and lithium oxide introduced into the formulation via any element or suitable compound form.

As indicated above the calcium oxide can be partially or wholly substituted by strontium oxide and/or barium oxide.

The aforementioned elements Zr, Sn or Ti may be introduced into the formulation via any element or suitable compound form. In the main, oxides and silicates are used due to their availability, cost effectiveness, and known purity. This does not, however, preclude the addition of the aforementioned compounds in other forms. Those compound forms most frequently used in the glass industry include, for example, mineral compounds, oxides, hydroxides, silicates, carbonates, sulphates, and nitrates. Elemental forms are not usually used due to the hazardous nature of elements in powder form; this does not, however, preclude their use in such form.

It has not hitherto been appreciated to formulate a transparent, low alumina alkali borosilicate based, vitreous glass composition which is based on the incorporation of a major single addition of one of the aforementioned elements and utilizing process methods outlined in the application mentioned.

The desired properties may thus be 'designed in' dependent upon application requirements, by varying the selection from the aforementioned elements which will comprise the major addition. For example, tin promotes fluidity or fluxing of glasses at relatively low temperatures and also improves the resistance to acids. Additions of zirconium promote gloss and durability, both with regard to alkali chemical and abrasion resistance. Titanium, in addition to promoting gloss and fluidity, also improves acid resistance. All three elements act to confer high refractive indices and promote colour protection/stabilization, in the case of coloured glasses.

It is an attribute of the present invention that the low alumina alkali borosilicate will contain 40 to 69 wt % (based on the total amount of the low alumina borosilicate) silica and is thus described as being silicatic, silicate, or silica based.

Further, the level of boric oxide is set between 10 to 30 wt %, whilst the level of alumina is set between 0.5 to 6.0 wt %.

Small amounts of $Al_2O_3$ (0.5 to 6.0 wt %) are beneficial to the maintenance of gloss of the transparent glass based upon the present invention. Alumina additions are frequently recommended in the literature in order to promote opacification, and certainly with additions of alumina>6.0 wt %, this is true.

It is a characteristic of the present invention that the calcia or alternatively SrO and/or BaO as mentioned above is maintained at a level between 0.5 to 6.0 wt %, whilst the level of sodium oxide and/or potassium oxide is set between 10 to 30 wt % and that of lithium oxide at 0.1 to 2.0 wt %, each amount being calculated on basis of the total amount of low alumina alkali borosilicate. This formulation of a low alumina alkali borosilicate applicable to the full range of application areas specified may be represented as shown in Table I below. It should be noted that the single amounts given for the low alumina alkali borosilicate in Table I and II are based upon the total amount of the low alumina alkali borosilicate.

TABLE I

| COMPOSITION | | WT % |
|---|---|---|
| low alumina alkali borosilicate | $SiO_2$ | 40 to 69 |
| | $B_2O_3$ | 10 to 30 |
| | $Al_2O_3$ | 0.5 to 6.0 |
| | CaO | 0.5 to 6.0 |
| | $Na^2$ | } 10 to 30 |
| | $K_2O$ | |
| | $Li_2O$ | 0.1 to 2.0 |
| | Total | up to 98% |
| single major addition selected from the group | $ZrO_2$ $SnO_2$ $TiO_2$ | } 2 to 20 |

A more specific example of the present invention which is applicable to the field of glass crystal may be formulated as shown in Table II below.

TABLE II

| COMPOSITION | | WT % |
|---|---|---|
| low alumina alkali borosilicate | $SiO_2$ | 45 to 60 |
| | $B_2O_3$ | 15 to 25 |
| | $Al_2O_3$ | 0.5 to 4.0 |
| | CaO | 0.5 to 4.0 |
| | $Na^2O$ | } 10 to 30 |
| | $K_2O$ | |
| | $Li_2O$ | 0.5 to 1.0 |
| | Total | up to 92% |
| single major addition selected from the group | $ZrO_2$ $SnO_2$ $TiO_2$ | } 8 to 20 |

In the composition outlined in the above Tables I and II it should be noted SrO and/or BaO may be partially or wholly substituted for CaO in the amounts given.

It should further be noted, that the composition can contain less than 10 wt % of at least one element of a minor addition as mentioned above, based on the total amount of said minor addition (c), the low alumina alkali borosilicate (a) and the single major addition (b).

It is a preferred embodiment of the present invention that the range of single major addition selected from the aforementioned elements shall be 8 to 20 wt %, and further that the level of boric oxide is between 15 to 25 wt %.

It will be appreciated then that any low alumina alkali borosilicate based composition which contains low amounts (i.e.<6.0 wt % and preferably 4 wt %) of alumina, no other listed major addition as has been previously referred to, i.e. bismuth oxide, barium oxide, zinc oxide, lanthanum oxide etc., in conjunction with a single major addition (2 to 20 wt %) of the aforementioned elements (as calculated on basis of the oxide form), will fall within the scope of the present invention. Such glass compositions would thus be described as low alumina alkali borosilicate which contain a single major addition selected from the aforementioned elements in soluble form, which confer the main and above-described benefits to the final silica based composition. The invention would read onto the above composition because a single major addition selected from the aforementioned elements could no longer realistically be described as an optional/minor addition relative to the other elements (e.g. bismuth, barium, zinc, strontium, and lanthanum) of the composition for which certain property benefits are overriding.

It is apparent that the level of boric oxide addition at its maximum preferred value shown in Table II (25 wt %) is relatively high. At these higher levels of addition, it would be assumed by a person skilled in the art of glass that chemical, abrasion, and crazing resistance and colour stabilization properties would deteriorate to such an extent that the composition would be of no commercial value.

This is widely referred to as the boric oxide 'anomaly'. This maxima is widely quoted as being within the range 10 to 15 wt %.

In the present invention, however, it is contended that the combination of an intermediate oxide selected from the group of elements, Zr, Sn or Ti, in combination with the relatively high amounts of alkali oxides ($Na_2O$ and/or $K_2O$) contained in the low alumina borosilicate act to raise the boric oxide level to 15 to 25 wt %,-while still retaining chemical durability.

We claim:
1. An unleaded durable transparent vitreous glass composition consisting of a combination of
    (a) a low alumina alkali borosilicate consisting of:
        40 to 69 wt % silica ($SiO_2$),
        10 to 30 wt % boric oxide ($B_2O_3$),
        0.5 to 6.0 wt % aluminium oxide ($Al_2O_3$),
        0.5 to 6.0 wt % calcium oxide (CaO),
        10 to 30 wt % sodium oxide ($Na_2O$) and potassium oxide ($K_2O$), of mixtures thereof
        0.1 to 2.0 wt % lithium oxide ($Li_2O$),
    based on the total amount of the low alumina alkali borosilicate,
    (b) 2–20 wt % of a major addition of one element selected from the group consisting of zirconium, tin and titanium, and
    (c) less than 10 wt % of at least one element selected from the group consisting of bismuth, barium, strontium, zinc, lanthanum, molybdenum and cerium wherein the amounts of (a), (b) and (c) are calculated on the basis of the total amount of the oxide forms of (a), (b) and (c).

2. A composition according to claim 1, having 8 to 20 wt % of (b).

3. A composition according to claim 1, wherein the low alumina alkali borosilicate consists of:
    45 to 60 wt % silica,
    15 to 25 wt % boric oxide,
    0.5 to 4.0 wt % aluminium oxide,
    0.5 to 4.0 wt % calcium oxide,
    10 to 20 wt % sodium oxide, potassium oxide, or mixtures thereof
    0.5 to 1.0 wt % lithium oxide,
based on the total amount of the low alumina alkali borosilicate.

4. A composition according to claim 1 wherein, calcium oxide is partially or wholly replaced by strontium oxide, barium oxide or mixtures therefore.

5. A composition according to claim 3, wherein the calcium oxide is partially or wholly replaced by strontium oxide, barium oxide, or mixtures thereof.

6. A composition according to claim 1, wherein said elements are introduced as oxide forming materials.

7. A composition according to claim 6, wherein said elements are introduced as hydroxides, silicates, carbonates, sulphates, or nitrates of said elements.

8. A composition according to claim 3, wherein said elements are introduced as oxide forming materials.

9. A composition according to claim 8, wherein said elements are introduced as hydroxides, silicates, carbonates, sulphates, or nitrates of said elements.

10. A vitreous glass article prepared from the unleaded, durable, transparent vitreous glass composition according to claim 1.

11. A vitreous glass article prepared from the unleaded, durable, transparent vitreous glass composition according to claim 3.

12. The article according to claim 10, wherein said composition is in monolithic or powder form.

13. The article according to claim 11, wherein said composition is in monolithic or powder form.

14. A process for the production of a vitreous glass composition, comprising mixing together:
    (a) a low alumina alkali borosilicate consisting of:
        40 to 69 wt % silica ($SiO_2$),
        10 to 30 wt % boric oxide ($B_2O_3$),
        0.5 to 6.0 wt % aluminium oxide ($Al_2O_3$),
        0.5 to 6.0 wt % calcium oxide (CaO),
        10 to 30 wt % sodium oxide ($Na_2O$) and/or potassium oxide ($K_2O$),
        0.1 to 2.0 wt % lithium oxide ($Li_2O$),
    based on the total amount of the low alumina alkali borosilicate,
    (b) 2–20 wt % of a major addition of one element selected from the group consisting of zirconium, tin and titanium, and
    (c) less than 10 wt % of at least one element selected from the group consisting of bismuth, barium, strontium, zinc, lanthanum, molybdenum and cerium wherein the amounts of (a), (b) and (c) are calculated on the basis of the total amount of the oxide forms of (a), (b) and (c);
    and melting at a temperature between 1150°–1250° C. for 1 to 4 hours, subsequently fritting and optionally grinding the resulting fragments.

15. The process according to claim 14 wherein the low alumina alkali borosilicate consists of:
    45 to 60 wt % silica,
    15 to 25 wt % boric oxide,
    0.5 to 4.0 wt % aluminium oxide,
    0.5 to 4.0 wt % calcium oxide,
    10 to 20 wt % sodium oxide and/or potassium oxide,
    0.5 to 1.0 wt % lithium oxide,
based on the total amount of the low alumina alki borosilicate.

* * * * *

UNITED STATES PATENT AND TRADEMARK OFFICE
CERTIFICATE OF CORRECTION

PATENT NO.: 5,827,790

DATED: October 27, 1998

INVENTOR(S): Philip A. Evans et al.

It is certified that an error appears in the above-identified patent and that said Letters Patent is hereby corrected as shown below:

Column 7, line 66, claim 3, after "thereof" insert a comma (--,--).

Column 8, line 3, claim 4, after "claim 1" insert a comma (--,--) and delete the comma following "wherein".

Signed and Sealed this

Eighth Day of June, 1999

Attest:

Q. TODD DICKINSON

*Attesting Officer*    *Acting Commissioner of Patents and Trademarks*